Patented Nov. 10, 1931

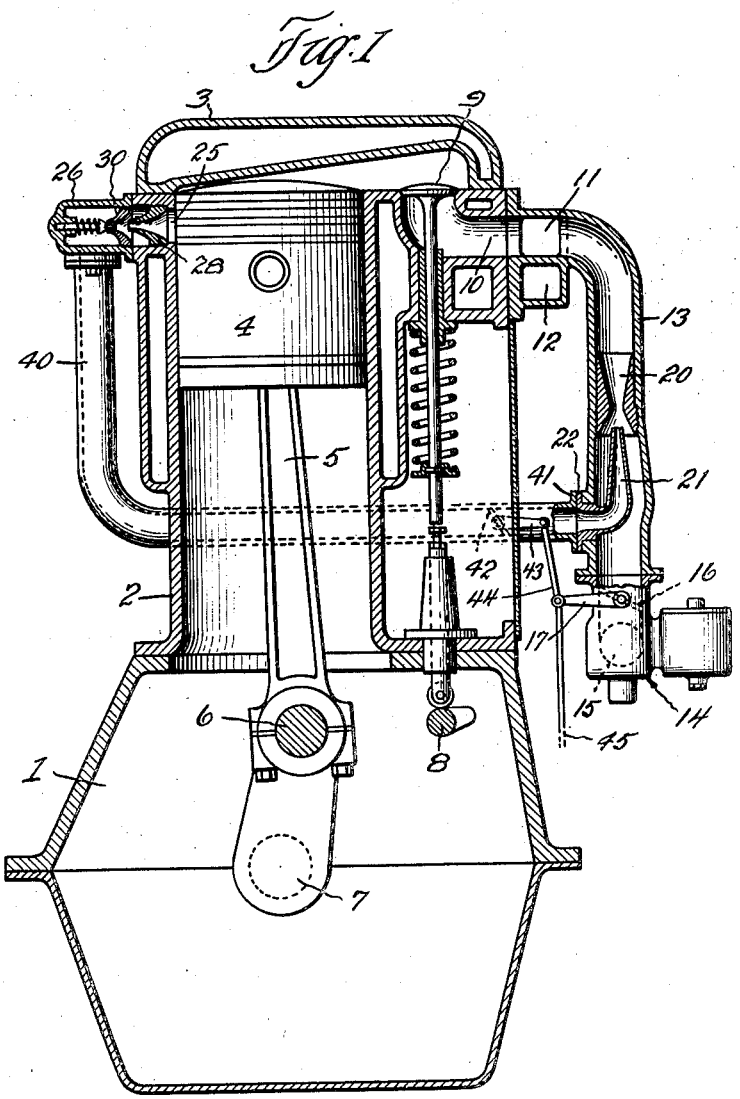

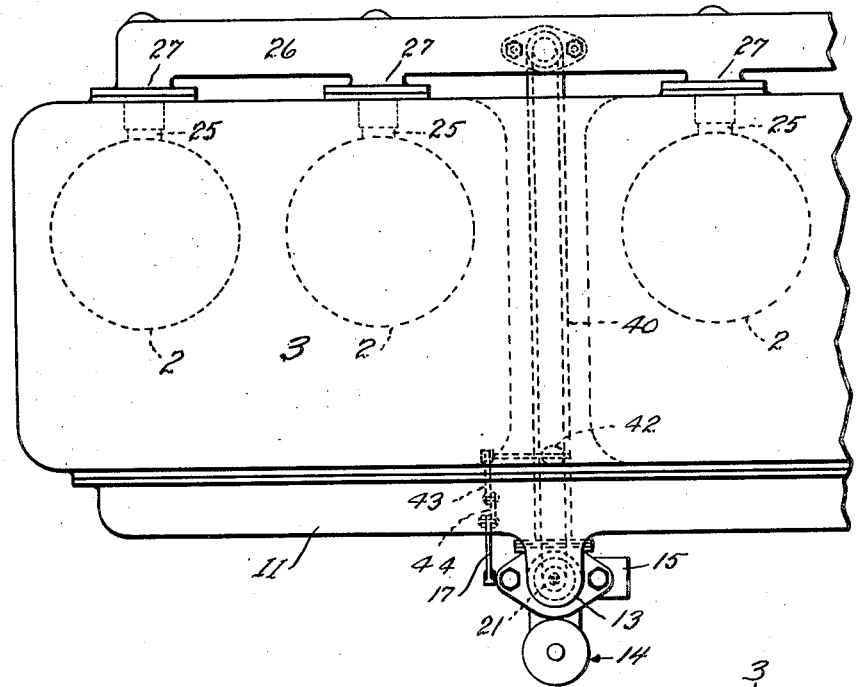
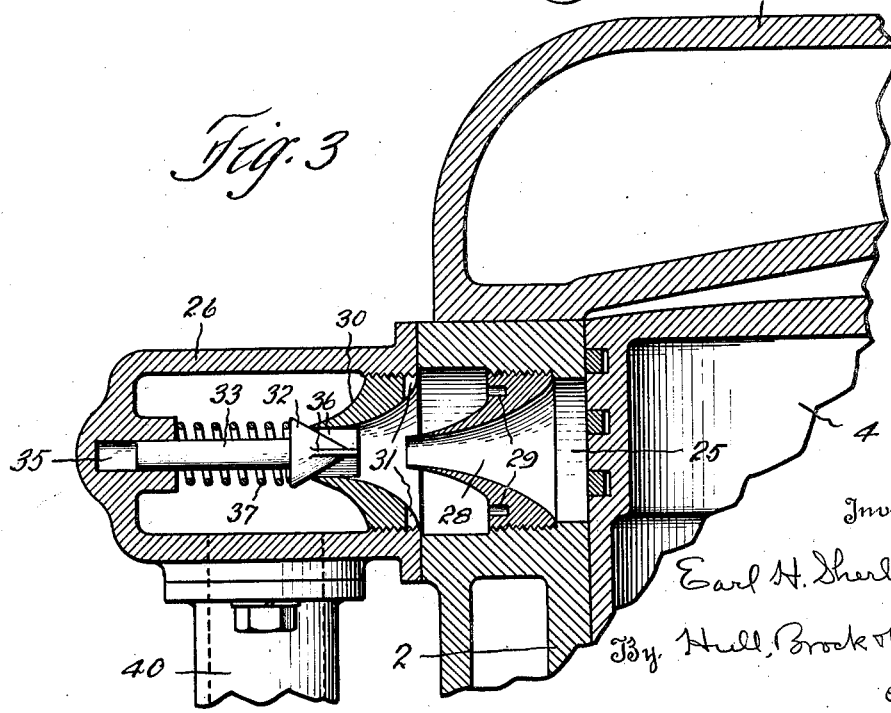

1,831,470

UNITED STATES PATENT OFFICE

EARL H. SHERBONDY, OF CLEVELAND, OHIO, ASSIGNOR TO DEAN M. SOLENBERGER, OF CLEVELAND, OHIO

MEANS FOR SUPERCHARGING INTERNAL COMBUSTION ENGINES

Application filed July 5, 1927. Serial No. 203,553.

This invention relates to a method of and means for supercharging internal combustion engines, especially of the class used to propel automotive vehicles or conveyances, and its general purpose is to increase the power of the engine by inducing or creating a flow of combustible mixture to the engine cylinders that is greater than that ordinarily resulting from the suction caused by the normal operation of an engine. In this way, more mixture is injected into the cylinders during the induction strokes than would otherwise occur, hence increased power and consequently greater possible speed.

The method comprehended by the invention may be defined broadly as consisting in obtaining directly from the cylinders of the engine fluid under pressure and directing the same in impelling relation to the flow of combustible mixture from the carburetor to the engine thereby to increase said flow.

Another object of the invention is to provide means that will retard or prevent appreciable or any return flow of the pressure fluid to the cylinders.

A further object is to so construct said return-flow retarding or preventing means that said means will, under certain circumstances, serve to increase the pressure of the fluid.

Another object is to so locate the pressure fluid outlet opening of each cylinder that said opening will be covered at times by the piston in said cylinder, the advantages arising from such an arrangement becoming apparent later on in this description.

A still further object of the invention is to provide relatively simple supercharging means that is economical from both standpoints of construction and operation and that is readily adapted to engines of standard type and principle, and that, in case any disorder arises within the supercharging means, impairing its operation or completely throwing it out of commission, will not interfere with the engine's continuing to operate satisfactorily in accordance with standard practice and with substantially the same degree of efficiency as an engine of ordinary type.

A still further and more specific object is to provide supercharging means comprising a pressure fluid chamber that communicates with the cylinders of the engine, an injector arranged to discharge, preferably through a venturi, into the induction pipe of the engine, and which injector is in communication with said pressure fluid chamber, the injector being desirably situated between the carburetor and the intake manifold, a valve or shutter for controlling the flow of pressure fluid to the injector, and, preferably, means for operating said valve or shutter in unison with the throttle that controls the flow of explosive mixture to the engine.

Among further objects which will appear as I proceed to describe the invention in detail, is that of providing a construction that is compact and substantial and is not likely to get out of order and wherein all parts are readily accessible for purposes of inspection, cleaning and replacement.

An embodiment of the invention wherein the above mentioned objects are attained is illustrated in the accompanying drawings and while I shall proceed to describe the same in detail it will be understood that I do not limit myself to the structural features thereof further than is required by the terms of the appended claims as construed in the light of the prior art.

In the drawings, Fig. 1 is a vertical section through an internal combustion engine incorporating my improved supercharger; Fig. 2 is a fragmentary plan of the same; and Fig. 3 is an enlarged sectional detail through the pressure fluid chamber and an adjacent portion of one of the engine cylinders and piston, showing the return-flow retarding or preventing means.

The engine wherewith I have shown my improved supercharger associated is standard in all respects excepting as to such changes as are necessary in order to adapt the supercharger to it, and the same may be described briefly as comprising a crank case 1, a cylinder block 2 that surmounts the crank case and is preferably made in two sections according to common practice, and a head 3 that is applied to the two sections of the block. Operating within each cylinder is a piston 4 that is connected through a rod 5 with the corresponding crank 6 of the main shaft 7, and suitably driven from said shaft is the cam shaft 8 that actuates the inlet and exaust valves. An inlet valve is shown at 9 and the same controls a port 10 that communicates with the inlet manifold 11. Shown as formed integral with the inlet manifold is the exhaust manifold 12 and the induction pipe 13, the latter opening at its upper end into the inlet manifold and having applied to its lower end a carburetor 14 which may be of any approved type. The air inlet of the carburetor is designated 15 and a throttle, designated 16, is operated by means of an arm 17 that is secured to the protruding end of the throttle shaft.

A Venturi tube 20 is shown as located within the induction pipe 13 between the carburetor and the intake manifold, and operatively related to said Venturi tube is an injector nozzle 21. This nozzle is shown in the form of an L and as having a base flange 22, and the nozzle is adapted to be extended through an opening in the side of the induction pipe with its base flange engaged against a boss surrounding said opening. Prior to the insertion of the nozzle and the attachment of the carburetor to the lower end of the induction pipe the Venturi tube 20 may be inserted upwardly through the lower end of the said pipe and screwed into the threaded portion of said pipe provided for the purpose.

Outlet openings 25 are formed in the cylinder walls adjacent the upper ends of the cylinders, and applied to the cylinder block in communication with said openings is a pressure fluid chamber or header 26, said chamber having a hollow boss 27 communicating with each of said openings. As appears more clearly from Fig. 3, the externally threaded inner end of a so-called "one-way" nozzle 28 is adapted to be inserted through the larger outer end of each of the openings 25 and screwed into the threaded portion of said opening, as by means of a suitable spanner wrench engaged with sockets 29 that are provided for its reception. A similar nozzle 30 is threaded into each of the throats 27 of the pressure fluid chamber 26, the base of each of said nozzles having grooves 31 for the application of a suitable turning tool.

The nozzles 28 and 30 are designed to increase the kinetic pressure of the fluid as it is discharged from the engine cylinders into the chamber and to very materially retard return flow. Hence, the above appellation "one-way". While each nozzle is very efficient in the attainment of this desired result, a plurality of such nozzles in series is highly effective in preventing appreciable back flow, so that, in the absence of anything further for stopping the return flow of pressure fluid to the cylinders, one or more of these nozzles would be quite satisfactory. However, in order to effect a stoppage, or increase the retardation, of back flow to a maximum degree, I propose to employ valves for checking the return flow, and one of these valve, designated 32, is shown in Figs. 1 and 3 as cooperating with the inner end of the corresponding nozzle 30. The valve is provided with a stem 33 that operates within a bore 35 in the wall of the chamber 26 opposite the nozzle 30 wherewith the said valve cooperates and the valve is further guided by fins 36 that slide within the reduced end of the nozzle. A relatively light spring 37 surrounds the valve stem and is compressed between the valve and the inner end of a boss that projects from the chamber wall about the bore 35.

Connected to the underside of the pressure fluid chamber 26 at about its longitudinal center and in communication with an outlet opening thereof is a conduit 40 which leads downwardly and thence transversely of the engine between the sections of the cylinder block to where it is attached, through a flange 41, to the induction pipe 13 in register with the opening of the nozzle 21, the base flange 22 of said nozzle being clamped between the flange of the conduit and the boss of the induction pipe wherewith said base flange engages. A valve or shutter 42 is preferably placed within the conduit 40 and its operating arm 43 is shown as connected, by a link 44, with the operating arm 17 of the throttle 16, so that when the throttle is adjusted through the medium of a rod 45, the valve or shutter 42 will be moved in unison with it.

When the engine is in operation, and considering for the purpose of description the action that takes place in but one of the cylinders during the compression stroke of the piston 4, a part of the compressed gas will be expelled through the opening 25 and the nozzles 28 and 30, past the valve 32, into the chamber 26, the piston serving to close the opening 25 just before the final compression of the mixture. The compressed charge within the cylinder is then ignited in the usual way by means of a spark plug (not shown) and immediately after the explosion and as soon as the piston moves far enough to uncover the opening 25, a part of the exploded gas will be discharged through the opening 25 into the chamber 26, and the quantity of unexploded gas of the previous compression stroke that was trapped within the opening 25 inwardly of the nozzle 28, and especially that occupying the cavity between the two nozzles 28 and 30, will be ignited by the exploded charge and will shoot through the nozzles at a very high velocity thus increasing the compression of the fluid within the chamber.

During the subsequent scavenging stroke of the piston a small part of the burnt gas will be expelled through the opening 25, but during the following induction stroke, when a sub-atmospheric pressure prevails in the cylinder, the valve 32 will positively prevent the pressure fluid within the chamber from flowing back into the cylinder.

The pressure fluid from the chamber 26 flows through the conduit 40 to the nozzle 21 from which it issues at a high velocity through the Venturi tube 20, thus creating within the induction pipe 30 a flow of explosive mixture to the cylinders that is considerably greater than that caused by the induction strokes of the pistons. By reason of this a greater volume of mixture will be drawn from the carburetor and injected under a relatively high kinetic pressure into the engine cylinders, and the increased amount of gas thus delivered to the cylinders will result in greater power and a consequential higher possible speed.

The carburetor is, of course, adjusted to compensate for the added fluid issuing from the injector nozzle, and in order to prevent an unbalanced condition occurring at the instant the throttle 16 is moved more or less toward closed position, the shutter 42 is employed for instantly reducing the amount of this additional fluid. Very soon after a material change in the speed of the engine has been effected by an adjustment of the throttle, however, the pressure in the chamber 26 will rise or fall accordingly, as will be readily understood.

Having thus described my invention, what I claim is:

1. In a supercharger for internal combustion engines, the combination of a pressure fluid chamber communicating with the cylinders of the engine, one-way nozzles at the points of communication between the chamber and the cylinders for checking return flow of pressure fluid from the chamber to the cylinders, and a conduit communicating with said chamber and arranged to deliver pressure fluid from said chamber in impelling relation to the flow of explosive mixture from the carburetor to the engine thereby to increase said flow.

2. In a supercharger for internal combustion engines, the combination of a pressure fluid chamber communicating with the cylinders of the engine, a plurality of one-way nozzles at each point of communication between said chamber and the cylinders for checking return flow of the pressure fluid from the chamber to the cylinders, and a conduit communicating with the chamber and arranged to discharge pressure fluid from the chamber in impelling relation to the flow of explosive mixture from the carburetor to the engine thereby to increase said flow.

3. In a supercharger for internal combustion engines, the combination of a pressure fluid chamber communicating with the cylinders of the engine, a plurality of one-way nozzles arranged in series at each point of communication between said chamber and the cylinders for checking return flow of the pressure fluid from the chamber to the cylinders, and a conduit communicating with the chamber and arranged to discharge pressure fluid from the chamber in impelling relation to the flow of explosive mixture from the carburetor to the engine thereby to increase said flow.

4. In a supercharger for internal combustion engines, a pressure fluid chamber communicating with the cylinders of the engine, a one-way nozzle at each of the points of communication between said chamber and the cylinders, a check valve cooperating with each of said nozzles, and a conduit communicating with said chamber and arranged to deliver pressure fluid therefrom in impelling relation to the flow of explosive mixture from the carburetor to the engine thereby to increase said flow.

5. In combination with an internal combustion engine having pressure fluid outlet openings in its cylinder walls that are adapted to be covered by the pistons when said pistons are adjacent the upper ends of the cylinders, a pressure fluid chamber communicating with said outlet openings, a plurality of one-way nozzles situated at each of the outlet openings for checking return flow of the pressure fluid from the chamber to the cylinders, the adjacent nozzles at each opening being spaced apart to provide therebetween a gas pocket, and a conduit communicating with said chamber and arranged to discharge pressure fluid therefrom in impelling relation to the flow of explosive mixture from the carburetor to the engine.

6. A supercharging mechanism for an internal combustion motor including an injector nozzle in the intake pipe of said motor, a conduit connecting said nozzle with the exhaust of said motor, a port in one wall of a cylinder of said motor and communicating with said exhaust, and a nozzle having a generally conical interior surface and being directed away from said cylinder positioned in and obstructing said port.

7. A supercharging mechanism for an internal combustion motor including an injector nozzle in the intake pipe of said motor, a conduit connecting said nozzle with the exhaust of said motor, a port in one wall of a cylinder of said motor and communicating with said exhaust, a nozzle converging away from said cylinder and obstructing said port, and a one-way valve adjacent said nozzle and also obstructing said port.

In testimony whereof, I hereunto affix my signature.

EARL H. SHERBONDY.